United States Patent
Borthakur

(12) 
(10) Patent No.: US 6,761,874 B2
(45) Date of Patent: Jul. 13, 2004

(54) PROCESS FOR THE PREPARATION OF HYDROGEN PEROXIDE

(75) Inventor: Naleen Borthakur, Assam (IN)

(73) Assignee: Council of Scientific and Industrial Research, New Delhi (IN)

( * ) Notice: Subject to any disclaimer, the term of this patent is extended or adjusted under 35 U.S.C. 154(b) by 363 days.

(21) Appl. No.: 10/024,205

(22) Filed: Dec. 21, 2001

(65) Prior Publication Data

US 2003/0165421 A1 Sep. 4, 2003

(51) Int. Cl.$^7$ ............................................. C01B 15/022
(52) U.S. Cl. ....................................................... 423/587
(58) Field of Search ................................ 423/587, 588, 423/589, 590

(56) References Cited

U.S. PATENT DOCUMENTS 6,342,196 B2 * 1/2002 Beckman et al. ........... 423/588

* cited by examiner

*Primary Examiner*—Wayne A. Langel
(74) *Attorney, Agent, or Firm*—Burns, Doane, Swecker & Mathis, L.L.P.

(57) ABSTRACT

The invention provides a process for the preparation of hydrogen peroxide by hydrogenating 3-2-(oxopropyl)-2 (1H)-quinoxalinone in the presence of a palladium catalyst and contacting the 3-2-(oxopropyl)-1,2,3,4-tetrahydro-2-quinoxalinone with oxidant molecular oxygen or air in ethylacetate-water or chloroform-water biphasic system.

12 Claims, No Drawings

PROCESS FOR THE PREPARATION OF HYDROGEN PEROXIDE

FIELD OF THE INVENTION

The present invention relates to a process for the preparation of hydrogen peroxide. More particularly, the present invention relates to a process for the preparation of hydrogen peroxide by hydrogenating 3-2-(oxopropyl)-2(1H)-quinoxalinone in the presence of a palladium catalyst and contacting the 3-2-(oxopropyl)-1,2,3,4-tetrahydro-2-quinoxalinone with oxidant molecular oxygen or air in ethylacetate-water or chloroform-water biphasic system.

BACKGROUND OF THE INVENTION

Hydrogen peroxide is one of the most important oxidising agents and is widely used in industry. Currently, the United States alone produces almost about 700000 tons of hydrogen peroxide. A substantial amount of hydrogen peroxide is used in the paper and pulp industry, waster disposal management, preparation of peroxygen compounds and as non-polluting environment friendly oxidising agents in chemical industry. The dominant current route to produce hydrogen peroxide from hydrogen and oxygen is the 'anthraquinone autoxidation process' which requires extraction of hydrogen peroxide by demineralised water from the reaction mixture in a separate step. Further, the hydrogen carrier 2-alkyl anthraquinone on hydrogenation produces several side-products such as hydrogenated aromatic rings, anthrones, tetrahydroalkylanthraquinone epoxide and the like [Kirk-Othmer Encyclopedia of Chemical Technology, 1996, $4^{th}$ ed., 13, 968–969].

It is also known to prepare hydrogen peroxide by 'alcohol autoxidation'. This route produces hydrogen peroxide by autoxidising isopropyl alcohol with oxygen enriched air in the range of 70–160° C. and 10–20 atm. The coproduct acetone is catalytically reduced back to isopropyl alcohol. The disadvantage of this route is that it requires drastic reaction conditions and high capital investment, and a complex product and catalyst recovery scheme [Kirk-Othmer Encyclopedia of Chemical Technology, 1996, $4^{th}$ ed., 13, 976–977].

In the 'ARCO' process, methylbenzyl alcohol (sec.phenylalcohol) is oxidised by molecular oxygen in liquid phase, giving acetophenone and hydrogen peroxide. The acetophenone is hydrogenated back to methylbenzyl alcohol. Here the formation of organic hydroperoxides is a concern and the oxidation requires drastic conditions such as temperature ~160° C., atmosphere ~10–20 atm. of air or oxygen [Kirk-Othmer Encyclopedia of Chemical Technology, 1996, $4^{th}$ ed., 13, 977].

Hydrogen peroxide has also been prepared by the aerobic oxidation of sec.alcohols catalysed by N-hydroxyphtalimide (NHPI) at a temperature of 75° C. During this process, NHPI is partially converted to phthalimide [T. Iwahama, S. Sakaguchi, Y. Ishii, Org Procs. Res. & Devl, 2000, 4, 97–98].

It is also known to prepare hydrogen peroxide by reacting hydrogen and oxygen with a Pt/Pd salt to produce an aqueous solution of hydrogen peroxide. The reaction conditions required are high pressure of hydrogen fees (140 kg/cm$^2$) and low temperature (10–17° C.) [Kirk-Othmer Encyclopedia of Chemical Technology, 1996, $4^{th}$ ed., 13, 977].

It is known to react carbon monoxide oxygen and water in the presence of palladium compound to obtain hydrogen peroxide by a non-hydrogen route. This reaction however, requires drastic conditions such as CO under 600 kPa and O$_2$ under 6500 kPa partial pressure and also the presence of CF$_3$COOH, etc [C. Shen, et al, J. Am. Chem. Soc., 2000, 122, 4029; R. Bortolo, et al, EP 788,988, Chemical Abstract, 1997, 127: 178353w; R. Bortolo et al, J. Mol. Catal. A: Chem., 2000, 153, (1–2), 25, Chemical Abstract, 2000, 132:224425z; D. Bianchi, et al, Angew Chem., Int. Ed., 1999, 38, 706 and W. Thiel, Angew. Chem., Intl. Ed., 1999, 38, 3157].

It is therefore important to devise and develop improved processes for the production of hydrogen peroxide which overcome the disadvantages of the prior art listed above.

OBJECTS OF THE INVENTION

The main object of the present invention is to provide a simple method for the production of hydrogen peroxide, which can be carried out at room temperature.

It is another object of the invention to provide a economical process for the production of hydrogen peroxide.

It is yet another object of the present invention to provide a process for the production of hydrogen peroxide where the hydrogen carrier and the solvent can be easily separated from the reaction mixture and recycled.

It is a further object of the invention to provide a process for the production of hydrogen peroxide where the work up of the product is simple.

SUMMARY OF THE INVENTION

The above and other objects of the invention are achieved by the process of the invention. To the best of the applicants' knowledge, no prior art discloses the direct production of hydrogen peroxide from hydrogen and molecular oxygen or air at mild conditions without requiring expensive engineering costs and operational risks associated with separation of hydrogen peroxide.

Accordingly, the present invention relates to a process for the preparation of hydrogen peroxide comprising (a) hydrogenating compound of formula I below

FORMULA I

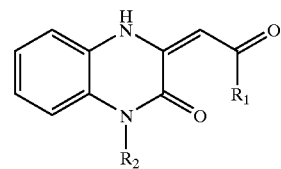

wherein R$_1$ is selected from CH$_3$, C$_2$H$_5$ and C$_6$H$_5$ and R$_2$ is selected from the group consisting of H and CH$_3$ provided that when R$_1$ is C$_2$H$_5$ or C$_6$H$_5$, R$_2$ is H, in the presence of a palladium catalyst to obtain compound of formula II;

FORMULA II

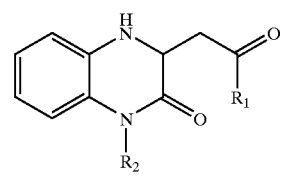

wherein R$_1$ is selected from CH$_3$, C$_2$H$_5$ and C$_6$H$_5$ and R$_2$ is selected from the group consisting of H and CH$_3$ provided that when R$_1$ is C$_2$H$_5$ or C$_6$H$_5$, R$_2$ is H, and (b) contacting the compound of formula II so obtained with an oxidant selected from the group consisting of molecular oxygen, air and a mixture thereof in a biphasic system selected from ethylacetate-water and chloroform-water systems to obtain hydrogen peroxide.

In one embodiment of the invention, the compound of formula I is selected from the group consisting of 3-2-(oxopropyl)-2(1H)-quinoxalinone, 3-2-(oxobutyl)-2(1H)-quinoxalinone and 3-2-(oxophenyl)-2(1H)-quinoxalinone to obtain 3-2-(oxopropyl)-1,2,3,4-tetrahydro-2-quinoxalinone, 3-2-(oxobutyl)-1,2,3,4-tetrahydro-2-quinoxalinone and 3-2-(oxophenyl)-1,2,3,4-tetrahydro-2-quinoxalinone respectively of formula II.

In another embodiment of the invention, the compound of formula II is contacted with oxidant in the presence of an organic solvent selected from the group consisting of benzene, ethyl acetate, chloroform, dichloromethane and tert.butyl alcohol.

In another embodiment of the invention, the compound of formula II is contacted with oxidant in the presence of a mineral acid, such as dilute sulphuric acid.

In another embodiment of the invention, the reaction is carried out at ambient temperature.

In another embodiment of the invention, compound of formula II is prepared from compound of formula I in the presence of Pd (10%)-carbon-$H_2$(30–40 psig) or Pd (5%)-carbon-$H_2$(30–40 psig).

In yet another embodiment of the invention, the hydrogenation pressure is in the range of 10–100 psig, preferably 20–40 psig.

In another embodiment of the invention, the product is obtained as an aqueous solution by removal of coloring materials from the water layer using activated carbon.

DETAILED DESCRIPTION OF THE INVENTION

The process of the invention involves hydrogenating compound of formula I in the presence of a palladium catalyst to obtain compound of formula II. This is then taken in a biphasic system comprising ethylacetate-water or chloroform-water and contacted with an oxidant selected from molecular oxygen or air or a mixture of the two under suitable reaction conditions. If desired a mineral acid such as dilute sulphuric acid can be added. The water layer is separated using a separating funnel and the coloured material in the water layer removed using activated carbon to obtain aqueous solution of hydrogen peroxide.

The compound of formula I is selected from the group consisting of 3-2-(oxopropyl)-2(1H)-quinoxalinone, 3-2-(oxobutyl)-2(1H)-quinoxalinone and 3-2-(oxophenyl)-2(1H)-quinoxalinone to obtain 3-2-(oxopropyl)-1,2,3,4-tetrahydro-2-quinoxalinone, 3-2-(oxobutyl)-1,2,3,4-tetrahydro-2-quinoxalinone and 3-2-(oxophenyl)-1,2,3,4-tetrahydro-2-quinoxalinone respectively of formula II.

The process can be conducted over a wide range of temperature (between 10–100° C., preferably between 20–40° C.) and pressure (between 10–100 psig, preferably between 20–40 psig).

Preferably the reaction is carried out under conditions outside the explosive range for the temperature, pressure and oxygen concentration. It is ideal to carry out the reaction under ambient conditions of temperature and pressure.

The hydrogen carrier amide compounds used in the process are regeneratable. Preparation of these compounds is described in M. Goswami and N. Borthakur, *Ind. J. Chem.*, 25 B, 525, 1986 and also in S. S. Nikam, A. D. Sahasrabudhe, R. K. Shastri, S. Ramanathan, *Synthesis*, 1983, 2, 145–146.

The following reaction scheme describes a preferred mode of performing the process of the invention:

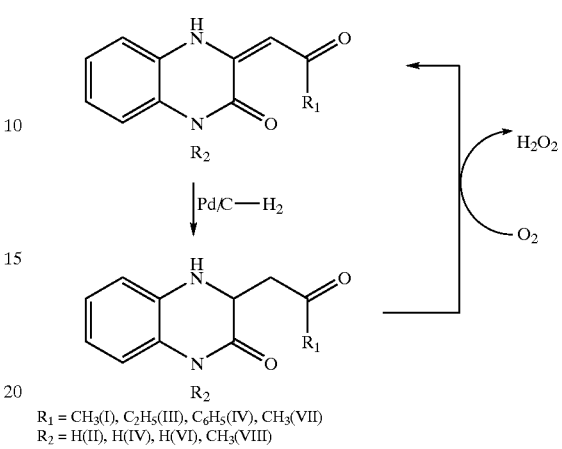

$R_1$ = $CH_3$(I), $C_2H_5$(III), $C_6H_5$(IV), $CH_3$(VII)
$R_2$ = H(II), H(IV), H(VI), $CH_3$(VIII)

The process of the invention are described in the following examples, which are illustrative and should not be construed as limiting the scope of the invention in any manner.

Preparation of Hydrogen Peroxide

EXAMPLE 1

365 mg (1.8 mmol) of 3-(2-oxopropyl)-2(1H)-quinoxalinone of the formula I where $R_1$ represents methyl and $R_2$ represents hydrogen was taken in methanol (25 ml) and hydrogenated using Pd(10%)/carbon catalyst under 40 psig pressure for 4 hours. The solution turned light coloured from yellow with the formation of 3-2-(oxopropyl)-1,2,3,4-tetrahydro-2-quinoxalinone of the formula II where $R_1$ represents methyl and $R_2$ represents hydrogen ($\lambda^{methanol}$ 303 nm). The solution was filtered to remove the catalyst. The solvent was then removed under vacuum. Compound II was taken in ethyl acetate (25 ml) and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to compound of formula I as indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 14% based on compound of formula I.

EXAMPLE 2

365 mg (1.8 mmol) of 3-(2-oxopropyl)-2(1H)-quinoxalinone of the formula I where $R_1$ represents methyl and $R_2$ represents hydrogen was taken in methanol (25 ml) and hydrogenated using Pd(5%)/carbon catalyst under 40 psig pressure for 4 hours. The solution turned light coloured from yellow with the formation of 3-2-(oxopropyl)-1,2,3,4- tetrahydro-2-quinoxalinone of the formula II where $R_1$ represents methyl and $R_2$ represents hydrogen ($\lambda^{methanol}$ 303 nm). The solution was filtered to remove the catalyst. The solvent was then removed under vacuum. Compound II was taken in ethyl acetate (25 ml) and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to compound of formula I as indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 14% based on compound of formula I.

EXAMPLE 3

365 mg (1.8 mmol) of 3-(2-oxopropyl)-2(1H)-quinoxalinone of the formula I where $R_1$ represents methyl and $R_2$ represents hydrogen was taken in methanol (25 ml) and hydrogenated using Pd(10%)/carbon catalyst under 40 psig pressure for 4 hours. The solution turned light coloured from yellow with the formation of 3-2-(oxopropyl)-1,2,3,4-tetrahydro-2-quinoxalinone of the formula II where $R_1$ represents methyl and $R_2$ represents hydrogen ($\lambda^{methanol}$ 303 nm). The solution was filtered to remove the catalyst and the solvent removed under vacuum. Compound of formula II was taken in chloroform (25 ml) and transferred to a 250 ml conical flask. To it was added dilute sulphuric acid (0.3 ml; 1:3) and deionised water (15 ml), and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 16% based on compound of formula I.

EXAMPLE 4

365 mg (1.8 mmol) of 3-(2-oxopropyl)-2(1H)-quinoxalinone of the formula I where $R_1$ represents methyl and $R_2$ represents hydrogen was taken in methanol (25 ml) and hydrogenated using Pd(5%)/carbon as catalyst under 40 psig pressure for 4 hours. The solution turned light coloured from yellow with the formation of 3-2-(oxopropyl)-1,2,3,4-tetrahydro-2-quinoxalinone of the formula II where $R_1$ represents methyl and $R_2$ represents hydrogen ($\lambda^{methanol}$ 303 nm). The solution was filtered to remove the catalyst and the solvent removed under vacuum. Compound of formula II was taken in chloroform (25 ml) and transferred to a 250 ml conical flask. To it was added dilute sulphuric acid (0.3 ml; 1:3) and deionised water (15 ml), and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 16% based on compound of formula I.

EXAMPLE 5

365 mg (1.8 mmol) of 3-(2-oxopropyl)-2(1H)-quinoxalinone of the formula I where $R_1$ represents methyl and $R_2$ represents hydrogen was taken in ethyl acetate (25 ml) and hydrogenated using Pd(10%)/carbon catalyst under 40 psig pressure for 4 hours. The solution turned light coloured from yellow with the formation of 3-2-(oxopropyl)-1,2,3,4-tetrahydro-2-quinoxalinone of the formula II where $R_1$ represents methyl and $R_2$ represents hydrogen ($\lambda^{methanol}$ 303 nm). The solution was filtered to remove the catalyst and transferred to a 250 ml conical flask. To it was added dilute sulphuric acid (0.2 ml; 1:3) and deionised water (15 ml), and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 14% based on compound of formula I.

EXAMPLE 6

365 mg (1.8 mmol) of 3-(2-oxopropyl)-2(1H)-quinoxalinone of the formula I where $R_1$ represents methyl and $R_2$ represents hydrogen was taken in ethyl acetate (25 ml) and hydrogenated using Pd(5%)/carbon catalyst under 40 psig pressure for 4 hours. The solution turned light coloured from yellow with the formation of 3-2-(oxopropyl)-1,2,3,4-tetrahydro-2-quinoxalinone of the formula II where $R_1$ represents methyl and $R_2$ represents hydrogen ($\lambda^{methanol}$ 303 nm). The solution was filtered to remove the catalyst and transferred to a 250 ml conical flask. To it was added dilute sulphuric acid (0.2 ml; 1:3) and deionised water (15 ml), and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 14% based on compound of formula I.

EXAMPLE 7

365 mg (1.8 mmol) of 3-(2-oxopropyl)-2(1H)-quinoxalinone of the formula I where $R_1$ represents methyl and $R_2$ represents hydrogen was taken in ethylacetate (40 ml) and hydrogenated using Pd(10%)/carbon catalyst under 40 psig pressure for 4 hours. The solution turned light coloured from yellow with the formation of 3-2-(oxopropyl)-1,2,3,4-tetrahydro-2-quinoxalinone of the formula II where $R_1$ represents methyl and $R_2$ represents hydrogen ($\lambda^{methanol}$ 303 nm). The solution was filtered to remove the catalyst and transferred to a 250 ml conical flask. To it was added deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform 1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 6% based on compound of formula I.

EXAMPLE 8

365 mg (1.8 mmol) of 3-(2-oxopropyl)-2(1H)-quinoxalinone of the formula I where $R_1$ represents methyl and $R_2$ represents hydrogen was taken in ethylacetate (40 ml) and hydrogenated using Pd(5%)/carbon catalyst under 40 psig pressure for 4 hours. The solution turned light coloured from yellow with the formation of 3-2-(oxopropyl)-1,2,3,4-tetrahydro-2-quinoxalinone of the formula II where $R_1$ represents methyl and $R_2$ represents hydrogen ($\lambda^{methanol}$ 303 nm). The solution was filtered to remove the catalyst and transferred to a 250 ml conical flask. To it was added deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 6% based on compound of formula I.

EXAMPLE 9

324 mg (1.5 mmol) of 3-(2-oxobutyl)-2(1H)-quinoxalinone of the formula I where $R_1$ represents ethyl and $R_2$ represents hydrogen was taken in ethyl acetate (25 ml) and hydrogenated using Pd(10%)/carbon catalyst under 40 psig pressure for 4 hours. The solution turned light coloured from yellow with the formation of 3-2-(oxobutyl)-1,2,3,4-tetrahydro-2-quinoxalinone of the formula II where $R_1$ represents ethyl and $R_2$ represents hydrogen ($\lambda^{methanol}$ 303 nm). The solution was filtered to remove the catalyst and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 7% based on compound of formula I.

EXAMPLE 10

324 mg (1.5 mmol) of 3-(2-oxobutyl)-2(1H)-quinoxalinone of the formula I where $R_1$ represents ethyl and $R_2$ represents hydrogen was taken in ethyl acetate (25 ml) and hydrogenated using Pd(5%)/carbon catalyst under 40 psig pressure for 4 hours. The solution turned light coloured from yellow with the formation of 3-2-(oxobutyl)-1,2,3,4-tetrahydro-2-quinoxalinone of the formula II where $R_1$ represents ethyl and $R_2$ represents hydrogen ($\lambda^{methanol}$ 303 nm). The solution was filtered to remove the catalyst and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide was 7% based on compound of formula I.

EXAMPLE 11

264 mg (10 mmol) of 3-(2-oxophenyl)-2(1H)-quinoxalinone of the formula I where $R_1$ is phenyl and $R_2$ is hydrogen was taken in ethyl acetate (25 ml) and hydrogenated using Pd(10%)/carbon catalyst under 40 psig pressure for 4 hours. The solution turned light coloured from yellow with the formation of 3-2-(oxophenyl)-1,2,3,4-tetrahydro-2-quinoxalinone of the formula II where $R_1$ represents phenyl and $R_2$ represents hydrogen ($\lambda^{methanol}$ 303 nm). The solution was filtered to remove the catalyst and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform 1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide=11% based on compound of formula I.

EXAMPLE 12

264 mg (1 mmol) of 3-(2-oxophenyl)-2(1H)-quinoxalinone of the formula I where $R_1$ is phenyl and $R_2$ is hydrogen was taken in ethyl acetate (25 ml) and hydrogenated using Pd(5%)/carbon catalyst under 40 psig pressure for 4 hours. The solution turned light coloured from yellow with the formation of 3-2-(oxophenyl)-1,2,3,4-tetrahydro-2-quinoxalinone of the formula II where $R_1$ represents phenyl and $R_2$ represents hydrogen ($\lambda^{methanol}$ 303 nm). The solution was filtered to remove the catalyst and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing was added to the aqueous phase. The aqueous phase had a light red colour. The aqueous phase was treated with activated carbon (100 mg) to remove the light red colour and then filtered to obtain a colourless aqueous solution. The hydrogen peroxide of this solution was estimated against standard potassium iodide solution. Yield of hydrogen peroxide=11% based on compound of formula I.

EXAMPLE 13

345 mg (1.5 mmol) of 1-methyl-3-(2-oxopropyl)-2(1H)-quinoxalinone of the formula I where $R_1$ and $R_2$ are both methyl was taken in ethyl acetate (25 ml) and hydrogenated using Pd(10%)/carbon catalyst under 40 psig pressure for 4 hours. The solution turned light coloured from yellow with the formation with the formation of 1-methyl-3-2-(oxopropyl)-1,2,3,4-tetrahydro-2-quinoxalinone of the formula II where $R_1$ and $R_2$ are both methyl ($\lambda^{methanol}$ 303 nm). The solution was filtered to remove the catalyst and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing added to the aqueous phase. The aqueous phase had a light red colour. The aqueous phase was treated with activated carbon (100 mg) to remove the light red colour and filtered to obtain a colourless aqueous solution. Hydrogen peroxide of this solution was estimated against standard potassium iodide solution. Yield of hydrogen peroxide=10% based on compound of formula I.

EXAMPLE 13

345 mg (1.5 mmol) of 1-methyl-3-(2-oxopropyl)-2(1H)-quinoxalinone of the formula I where $R_1$ and $R_2$ are both methyl was taken in ethyl acetate (25 ml) and hydrogenated using Pd(5%)/carbon catalyst under 40 psig pressure for 4 hours. The solution turned light coloured from yellow with the formation with the formation of 1-methyl-3-2-(oxopropyl)-1,2,3,4-tetrahydro-2-quinoxalinone of the formula II where $R_1$ and $R_2$ are both methyl ($\lambda^{methanol}$ 303 nm). The solution was filtered to remove the catalyst and transferred to a 250 ml conical flask. To it was added dilute sulphuric acid (0.2 ml, 1:3) and deionised water (15 ml) and molecular oxygen was bubbled (60 bubbles/minute) and stirred at room temperature (~25° C.) for 4 hours till compound of formula II was completely oxidised to formula I indicated by the appearance of deep yellow colour (TLC, acetone:chloroform=1:3). With air alone as oxidising agent, the reaction was completed in 24 hours. On completion of the reaction, the aqueous phase was separated and the organic phase was washed with water (10 ml) and the washing added to the aqueous phase. The aqueous phase had a light red colour. The aqueous phase was treated with activated carbon (100 mg) to remove the light red colour and filtered to obtain a colourless aqueous solution. Hydrogen peroxide of this solution was estimated against standard potassium iodide solution. Yield of hydrogen peroxide=10% based on compound of formula I.

ADVANTAGES OF THE PRESENT INVENTION

The main advantages of the present invention are:

1. The method is simple and can be carried out at room temperature.
2. Only hydrogen and oxygen are consumed in the reaction to produce hydrogen peroxide.
3. The hydrogen carrier quinoxalines of formula I used in the reaction are easily separated from the reaction mixture and can be recycled.
4. The solvent used in the reaction can be recycled.
5. Hydrogen peroxide produced is taken in aqueous phase.
6. The work up procedure is simple.

I claim:

1. A process for the preparation of hydrogen peroxide comprising (a) hydrogenating a compound of formula I

FORMULA I

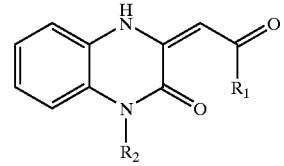

wherein $R_1$ is selected from $CH_3$, $C_2H_5$ and $C_6H_5$ and $R_2$ is selected from the group consisting of H and $CH_3$ provided that when $R_1$ is $C_2H_5$ or $C_6H_5$, $R_2$ is H, in the presence of a palladium catalyst to obtain a compound of formula II; and (b) contacting said compound of formula II

FORMULA II

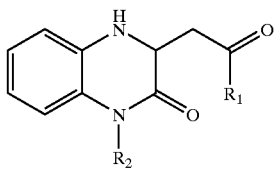

so obtained wherein $R_1$ is selected from $CH_3$, $C_2H_5$ and $C_6H_5$ and $R_2$ is selected from the group consisting of H and $CH_3$ provided that when $R_1$ is $C_2H_5$ or $C_6H_5$, $R_2$ is H, with an oxidant selected from the group consisting of molecular oxygen, air and a mixture thereof, in a biphasic system selected from ethylacetate-water and chloroform-water systems to obtain hydrogen peroxide.

2. A process as claimed in claim 1 wherein the compound of formula I is hydrogenated in the presence of an organic solvent selected from the group consisting of methanol and ethyl alcohol.

3. A process as claimed in claim 1 wherein the palladium catalyst is selected from the group consisting of Pd(10%)/carbon and Pd(5%)/carbon.

4. A process as claimed in claim 1 wherein the compound of formula II is contacted with oxidant in the presence of an organic solvent selected from the group consisting of benzene, ethyl acetate, chloroform, dichloromethane and tert.butyl alcohol.

5. A process as claimed in claim 1 wherein the compound of formula I is selected from the group consisting of 3-2-(oxopropyl)-2(1H)-quinoxalinone, 3-2-(oxobutyl)-2(1H)-quinoxalinone and 3-2-(oxophenyl)-2(1H)-quinoxalinone to obtain 3-2-(oxopropyl)-1,2,3,4-tetrahydro-2-quinoxalinone, 3-2-(oxobutyl)-1,2,3,4-tetrahydro-2-quinoxalinone and 3-2-(oxophenyl)-1,2,3,4-tetrahydro-2-quinoxalinone respectively of formula II.

6. A process as claimed in claim 1 wherein the compound of formula II is contacted with oxidant in the presence of a mineral acid.

7. A process as claimed in claim 6 wherein said mineral acid comprises dilute sulphuric acid.

8. A process as claimed in claim 1 wherein the reaction is carried out at ambient temperature.

9. A process as claimed in claim 1 wherein compound of formula II is prepared from the compound of formula I in the presence of Pd (10%)-carbon-$H_2$ (30–40 psig) or Pd (5%)-carbon-$H_2$ (30–40 psig).

10. A process as claimed in claim 1 wherein the hydrogenation pressure is in the range of 10–100 psig.

11. A process as claimed in claim 10 wherein the hydrogenation pressure is in the range of 20–40 psig.

12. A process as claimed in claim 1 wherein the hydrogen peroxide is obtained in the form of an aqueous solution by removal of coloring materials from the water layer using activated carbon.

\* \* \* \* \*